April 29, 1958 W. C. PIERCE 2,832,918
MAGNETIC DEVICE AND CONTROL THEREFOR
Filed April 7, 1955
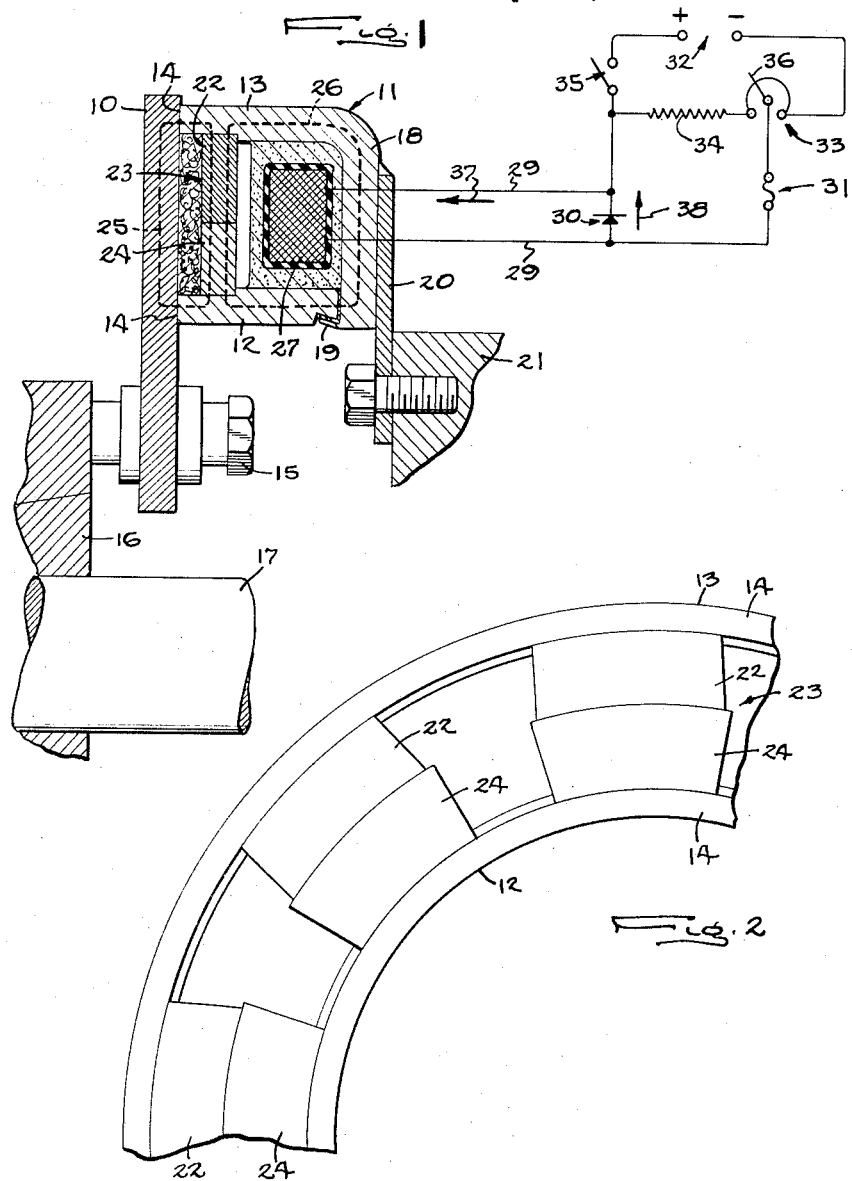
INVENTOR
William C. Pierce
By Carlson, Pitzner, Hubbard & Wolfe
ATTORNEYS United States Patent Office 2,832,918
Patented Apr. 29, 1958

2,832,918
MAGNETIC DEVICE AND CONTROL THEREFOR

William C. Pierce, Beloit, Wis., assignor to Warner Electric Brake & Clutch Company, South Beloit, Ill., a corporation of Illinois Application April 7, 1955, Serial No. 499,931

4 Claims. (Cl. 317—123)

This invention relates to a control circuit for energizing a coil of a magnetic device having a magnetized permanent magnet which provides the working flux of the device, but which is rendered ineffective without demagnetization of the magnet by direct current flow through the coil in a predetermined release direction, the magnetomotive force resulting from current flow through the coil in the reverse direction tending to demagnetize the permanent magnet.

The primary object of the invention is to avoid demagnetization of the permanent magnet by the provision of a novel coil energizing circuit which permits current flow through the coil only in the release direction and which is disabled to protect the magnet when a voltage of the improper polarity is applied to the coil through the circuit.

Another object is to provide a novel arrangement of two protective devices in the coil energizing circuit, one device operating to protect the coil against reverse current flow and the other device operating to disable the circuit thereby warning of loss of protection upon failure of the first device.

Other objects and advantages of the invention will become apparent from the following detailed description taken in connection with the accompanying drawings, in which Figure 1 is a diametrical sectional view of a magnetic torque producing device and a schematic wiring diagram of a control circuit therefor embodying the novel features of the present invention.

Fig. 2 is a fragmentary face view of the magnet member with the armature removed.

In the drawing, the invention is shown for purposes of illustration in a control for a permanent magnet friction brake comprising generally a rotatably mounted armature 10 in the form of a flat ring of magnetic material and a stationary magnet member including an annular shell or core 11 of magnetic material having radially spaced concentric pole pieces 12 and 13 terminating at one end in axially facing pole faces 14. The armature 10 spans the latter and is mounted for axial movement into gripping engagement therewith on a plurality of pins 15 angularly spaced around a support 16 fast on a rotatable shaft 17. The pole piece rings 12 and 13, at their other ends, are joined together to provide a core of channel cross section by a flat end ring 18 which is formed integral at its outer periphery with the outer pole piece and, at its inner periphery is fastened rigidly in abutment with the inner pole piece 12 by a thin flange 19 projecting from the end ring and clenched around an undercut surface of the pole piece. A plate 20 welded to the end ring 18 is bolted to a fixed support 21 to provide a stationary mounting for the core.

Magnetic flux for drawing the working faces of the armature 10 and the core 11 into axial gripping engagement is derived from a premagnetized permanent magnet 22 in the form of a plurality of bars closely spaced circumferentially around the core and forming a part of a magnetic connection 23 spanning the pole pieces 12 and 13 and spaced from the pole faces 14 and the bottom 18 of the channel. The connection 23 is completed by a plurality of spacer segments 24 of magnetic material whose inner and outer ends are machined to fit in close abutment with the inner pole piece and the magnet bars and hold the latter in close abutment with the outer pole piece 12. A suitable permanent magnet material such as an alloy of aluminum, nickel and cobalt sold under the trade name of Alnico V is utilized to form the magnet bars, while the parts of the core 11 including the spacer segments 24 are composed of low reluctance material such as annealed ingot iron.

It will be seen that the permanent magnet 22 forms a common part of two toroidal flux paths 25 and 26 for the permanent magnet flux as indicated by the dotted lines in Fig. 1. One path extends through the permanent magnet and axially back and forth between the armature 10 and the pole faces 14 and the other or shell path 26 extends through the magnet and around the bottom 18 of the channel so as to by-pass the armature. The permanent magnet flux divides between its two paths in inverse proportion to their reluctances, the shell path 26 being of higher reluctance than the main path so that a major portion of the permanent magnet flux constitutes working flux threading the armature.

Release of the brake is effected by energization of a multiple turn annular coil or winding 27 seated in a suitable cement 28 within the shell path 26 so as to encircle a part of the latter. The coil is operable, when energized by current flow in a forward or release direction through the leads 29, to produce a magnetomotive force in the shell path 26 tending to produce a flux in the latter in the same direction as the permanent magnet flux so that, in effect, the reluctance of the shell path to permanent magnet flux is reduced and the permanent magnet flux is diverted away from the armature 10 and into the shell path. When the release current is of a predetermined value, the flux in the armature path 25 is reduced substantially to zero thereby releasing the armature. The magnetomotive force resulting from current flow in the coil in the release direction tends to increase the magnetomotive force of the permanent magnet. Current flow in the opposite or reverse direction, however, produces a magnetomotive force tending to demagnetize the permanent magnet.

In accordance with the present invention, demagnetization of the permanent magnet 22 is avoided by the provision of a novel coil control circuit which permits current flow through the coil 27 only in the release direction under normal operating conditions and which is desirable to prevent any coil current flow whenever a voltage of the reverse polarity is applied to the coil or in the event of loss of the protection against such reverse voltage. This circuit comprises a polarity protection device 30 in the form of a rectifier connected in parallel with the coil to permit only release current flow through the coil and a current limiting device 31 for interrupting the circuit in response to reverse current flow or breakdown of the rectifier. Such operation is achieved by connecting the current limiting device in series with the parallel combination of the coil and the rectifier.

To permit only release current flow in the coil 27, the rectifier 30 is poled to act as a short circuit to current in the coil leads 29 in the reverse direction thereby shunting such current away from the coil. With such polarity of the rectifier, current flow therethrough in the release direction is blocked so that such current is forced through the coil. Herein, the rectifier is of the selenium dry plate type.

While the current limiting device 31 may comprise any type of overload device such as a relay or a circuit breaker, it is shown in the present instance as a fuse capable of passing current in the range of normal operating values of the coil current but having a maximum current rating less than the value of current flowing through the coil when the rectifier 30 is passing current. Thus, the fuse melts or breaks down to interrupt the coil circuit whenever a voltage is applied to the coil at a polarity tending to produce reverse current in the coil or when the rectifier breaks down to act as a short circuit for current in both directions.

Power for energizing the coil 27 is derived in this instance from a suitable direct current source 32 and is applied to the coil through a potentiometer 33 connected in series with a resistor 34 and a switch 35 across the source and permitting adjustment of the coil current flow. The coil leads 29 are connected respectively to the movable element 36 of the potentiometer 33 and to the same terminal of the source as the resistor 35. While the fuse may be connected in series with the source, it is shown herein as connected in series with one coil lead.

In the operation of the improved control circuit, closure of the switch 35, with the polarity of the source 32 as indicated by the plus and minus signs in Fig. 1, will result in current flow through the coil 27 in the release direction indicated by the arrow 37 due to the blocking action of the rectifier 30. The amount of this current flow determined by the setting of the potentiometer slider 36 is less than the melting value of the fuse 31.

When the coil 27 is connected to the source 32 with the polarities reversed so as to tend to produce a reverse current flow through the coil 27, the rectifier 30 acts a short circuit for such current and diverts the same away from the coil as indicated by the arrow 38 so as to avoid any demagnetization of the permanent magnet. The rectifier presenting substantially no resistance to such current flow, the current increases beyond the melting point of the fuse 31 which then operates to interrupt the coil circuit and thereby warn the operator of the application of a voltage of the improper polarity to the coil. The fuse also operates to warn the operator of loss of protection of the rectifier when the latter breaks down or is short circuited to pass current in both directions, the resistance in series with the fuse across the source in this case being only that of the potentiometer so that the current increases above the melting value of the fuse.

In one embodiment of the invention in which the resistance of the coil was approximately 200 ohms and the source 32 supplied 90 volts, a series resistor of 500 ohms and a potentiometer of 50 ohms total resistance enabled the coil current to be varied from a maximum of 450 milliamperes to a minimum of approximately 325 milliamperes, the fuse 31 being rated to melt to interrupt the coil circuit at a current of 1 ampere. Such maximum rated current of the fuse is substantially less than the current of 1.8 amperes flowing through the fuse when the rectifier is short circuited and the effective potentiometer resistance in series with the fuse is its maximum of 50 ohms.

It will be apparent that the novel arrangement of the rectifier 30 and the fuse 31 in circuit with the coil 27 not only protects the permanent magnet 22 by preventing current flow in the reverse direction through the coil, but also results in interruption of the circuit in response to application of the source voltage at the improper polarity to the coil leads 29. In addition, the fuse is blown to indicate the loss of the protection afforded by the rectifier whenever the latter is short circuited. This simple arrangement of parts thus insures retention of the magnetomotive force of the permanent magnet.

I claim as my invention:

1. The combination of, a core and an armature of magnetic material having opposed working faces, a magnetized permanent magnet cooperating with said core and said armature to define a main path for flux of the magnet extending through the magnet and the armature and a second path extending through the magnet and by-passing the armature, a coil encircling a part of said second path and operable, when energized by current flow in a release direction, to produce a magnetomotive force diverting the permanent magnet flux away from said armature and into the second path and, when energized by current flow in the opposite direction, to produce a magnetomotive force tending to demagnetize said magnet, said flux in said main path being reduced substantially to zero in response to current flow in the coil in said release direction and at a predetermined value, and an energizing circuit for said coil including a fuse connected in series with the coil and capable of passing current of said predetermined value and a rectifier connected in parallel with the coil and poled to divert current in said release direction through the coil and to act as a short circuit shunting current in said reverse direction around the coil, said fuse having a maximum current rating less than the value of current in said reverse direction flowing through said rectifier and around said coil.

2. The combination of, a core and an armature of magnetic material having opposed working faces, a magnetized permanent magnet cooperating with said core and said armature to define a main path for flux of the magnet extending through the magnet and the armature and a second path extending through the magnet and by-passing the armature, a coil encircling a part of said second path and operable, when energized by current flow in a release direction, to produce a magnetomotive force diverting the permanent magnet flux away from said armature and into the second path and, when energized by current flow in the opposite direction, to produce a magnetomotive force tending to demagnetize said magnet, and an energizing circuit for said coil having a rectifier connected in parallel with the coil and poled to divert current in said release direction through the coil and to shunt current in said reverse direction around the coil to avoid demagnetization of said magnet, said circuit including a disabling device connected in series with the coil and the rectifier and operable to interrupt the circuit in response to the increased current flow resulting from short circuiting of the rectifier and from the application to the coil and the rectifier of a voltage of a polarity producing coil current flow in the reverse direction.

3. The combination of, a core and an armature of magnetic material having opposed working faces, a magnetized permanent magnet cooperating with said core and said armature to define a main path for flux of the magnet extending through the magnet and the armature and a second path extending through the magnet and by-passing the armature, a coil encircling a part of said second path and operable, when a voltage of release polarity is applied to the coil leads, to produce a magnetomotive force diverting the permanent magnet flux away from said armature and into said second path and, when a voltage of a reverse polarity is applied to the coil leads, to produce a magnetomotive force tending to demagnetize said magnet, and an energizing circuit for said coil having a polarity protection device connected across said coil leads and permitting application of a voltage of said release polarity to said coil leads while providing a short circuit around the coil when a voltage of said reverse polarity is applied to the leads, said circuit including a disabling device operable to interrupt the circuit and prevent energization of the coil in response to the application of a voltage of said reverse polarity to said coil leads.

4. The combination of, a core and an armature of magnetic material having opposed working faces, a magnetized permanent magnet cooperating with said core and said armature to define a main path for flux of the magnet extending through the magnet and the armature and a second path extending through the magnet and by-passing the armature, a coil encircling a part of said second path and operable, when energized by current flow in a release direction, to produce a magnetomotive force diverting the permanent magnet flux away from said armature and into the second path and, when energized by current flow in the opposite direction, to produce a magnetomotive force tending to demagnetize said magnet, and an energizing circuit for said coil having a rectifier connected in parallel with the coil and poled to divert current in said release direction through the coil and to shunt current in said reverse direction around the coil to avoid demagnetization of said magnet.

References Cited in the file of this patent
UNITED STATES PATENTS

| | | |
|---|---|---|
| 1,779,724 | Beard | Oct. 28, 1930 |
| 2,130,870 | Boehne | Sept. 20, 1938 |
| 2,427,750 | Snyder | Sept. 23, 1947 |